United States Patent Office 3,121,082
Patented Feb. 11, 1964

3,121,082
PHOSPHITES AND PHOSPHONATES OF HYDROXYALKYL AND HYDROXYALKOXYALKYL ISOCYANURATES
Alvin Guttag, Bethesda, Md., assignor, by mesne assignments, to Union Carbide Corporation, a corporation of New York
No Drawing. Filed May 22, 1962, Ser. No. 196,614
10 Claims. (Cl. 260—248)

The present invention relates to novel phosphites and phosphonates.

It is an object of the present invention to prepare alcoholic hydroxyl containing phosphites which have good temperature stability.

Another object is to prepare phosphites having free hydroxyl groups which can be used to form flame-resistant polyurethanes.

A further object is to form novel phosphonates.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by forming the tris (trishydroxyalkyl) isocyanurate phosphites having the following formula

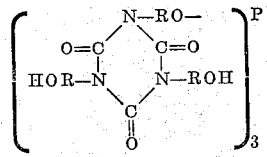

where R is an alkylene group having 2 to 4 carbon atoms, e.g., ethylene, propylene, 1-ethyl ethylene, or an alkylene oxyalkylene or an alkylene polyoxyalkylene group. The phosphonates of the present invention are formed by Arbuzov rearrangement of the corresponding phosphites.

The phosphite and phosphonate compounds of the present invention are useful as reactants in forming flame-resistant polyesters and polyurethanes. Thus, they can be reacted with a slight excess of an organic isocyanate, e.g., toluene diisocyanate, on an equivalence basis in the presence of a small amount of water to produce polyurethane foams having good flame and fire resistance. Such foams are useful as building insulation, upholstery filling, etc. The phosphites of the present invention also are useful as stabilizers for halogen containing resins. The phosphites and phosphonates are also useful as cross-linking and stabilizing agents for epoxy resins, e.g., from diepoxides as well as bisphenol A-epichlorhydrin.

The phosphites of the present invention are prepared by reacting 3 moles of a tris (hydroxyalkyl) isocyanurate with one mole of a triaryl phosphite in the presence of a catalyst such as a diaryl phosphite or a dialkyl phosphite, e.g., diphenyl phosphite, diethyl phosphite, didecyl phosphite, di-p-cresyl phosphite, in an amount of 0.1–10%, or in the presence of an alkaline catalyst, e.g., an alcoholate or phenolate such as sodium methylate, sodium decylate, sodium phenolate or potassium cresylate.

As the tris (hydroxyalkyl) isocyanurates there can be used tris (2-hydroxyethyl) isocyanurate, tris (2-hydroxypropyl) isocyanurate, tris (2-hydroxybutyl) isocyanurate.

Tris (2-hydroxyethyl) isocyanurate can be prepared in the manner taught by Frazier et al. in the Journal of Organic Chemistry, volume 25, pages 1944–1946 (1960). Tris (2-hydroxypropyl) isocyanurate can be formed in the manner described by Frazier (alkylene oxide reacted with cyanuric acid in the mole ratio of 3:1 in dimethyl formamide with sodium hydroxide catalyst) by replacing the ethylene oxide specifically used in Frazier with propylene oxide. Tris (2-hydroxybutyl) isocyanurate can be formed in similar manner by utilizing butylene oxide and the alkylene oxide.

As the triaryl phosphite there can be used triphenyl phosphite, tri p-cresyl phosphite, tri o-cresyl phosphite, tri xylenyl phosphite.

To prepare the phosphonates, the isocyanurate phosphites are isomerized, e.g., by heating with 1–10 mole percent of an alkyl halide, e.g., butyl bromide, amyl bromide or amyl chloride.

Examples of compounds within the present invention are tris [tris (2-hydroxyethyl) isocyanurate] phosphite, tris [tris (2-hydroxypropyl) isocyanurate] phosphite, tris [tris (2-hydroxybutyl) isocyanurate] phosphite, bis [tris (2-hydroxyethyl) isocyanurate] bis (2-hydroxyethyl) ethyl isocyanurate phosphonate, bis [tris (2-hydroxypropyl) isocyanurate] bis (2-hydroxypropyl) 2-methylethyl isocyanurate phosphonate, bis [tris (2-hydroxybutyl) isocyanurate] bis(2-hydroxybutyl)-2-ethylethyl isocyanurate phosphonate.

Unless otherwise indicated, all parts and percentages are by weight.

Example 1

3 moles (783.7 grams) of finely divided tris (2-hydroxyethyl) isocyanurate, 1 mole of triphenyl phosphite and 3 grams of diphenyl phosphite were heated in a vacuum, about 15 mm., and the phenol formed removed by distillation. The viscous liquid residue in the pot was tris [tris (2-hydroxyethyl) isocyanurate] phosphite.

Example 2

One mole of tris [tris (2-hydroxyethyl) isocyanurate] phosphite was heated to 120–130° C. with 5 mole percent of n-butyl bromide for 5 hours to form bis [tris (2-hydroxyethyl) isocyanurate] bis (2-hydroxyethyl) ethyl isocyanurate phosphonate as a viscous liquid having the formula

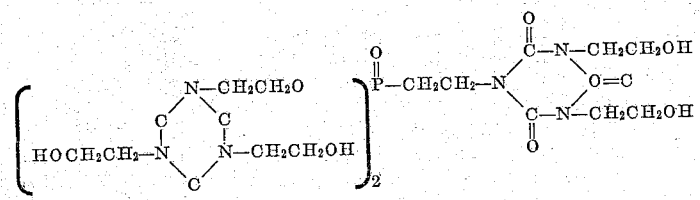

Example 3

The procedure of Example 1 was repeated replacing the tris (2-hydroxyethyl) isocyanurate with 3 moles of tris (2-hydroxypropyl) isocyanurate to recover [tris (2-hydroxypropyl) isocyanurate] phosphite as a viscous liquid residue after removal of the phenol formed by distillation.

Example 4

One mole of tris [tris (2-hydroxypropyl) isocyanurate] phosphite was heated to 125° C. with 5 mole percent of n-butyl bromide for 6 hours to form [tris (2-hydroxypropyl) isocyanurate] phosphonate as a viscous liquid having the formula

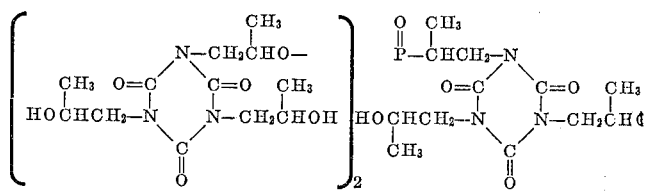

While most of the product formed will have the formula indicated above, there will be a minor fraction having primary hydroxyl groups since the starting tris (2-hydroxypropyl) isocyanurate is admixed with a minor amount of isomeric material wherein the hydroxyl group is primary due to the method of manufacture of the starting isocyanurate.

Additionally, according to the invention there can be prepared tris [tris (2-hydroxyalkyloxyalkyl) isocyanurate] phosphites and the isomeric phosphonates and tris [tris (2-hydroxyalkylpolyoxyalkyl) isocyanurate] phosphites and the isomeric phosphonates. The isomeric phosphonates are prepared from the phosphites in the manner previously described. These phosphites and phosphonates can be used in the manner previously set forth.

Examples of such phosphites and phosphonates are tris [tris (2-hydroxyethoxyethyl)isocyanurate] phosphite and the isomeric phosphonate, tris [tris (2-hydroxypolyethoxyethyl) isocyanurate] phosphite wherein the polyethoxy group has a molecular weight of 2000 and the isomeric phosphonate, tris [tris (2-hydroxypropoxypropyl) isocyanurate] phosphite and the isomeric phosphonate, tris [tris (2-hydroxypolypropoxypropyl) isocyanurate] phosphite wherein the polypropoxy group has a molecular weight of 3000 and the isomeric phosphonate, tris [tris (2-hydroxypropoxypolyethoxy polypropoxypropyl) isocyanurate] phosphite wherein the polyethoxy portion of the molecule has a molecular weight of 400 and the polypropoxy portion of the molecule has a molecular weight of 1900, tris [tris (2-hydroxybutoxybutyl) isocyanurate] phosphite and the isomeric phosphonate.

These products man be prepared by substituting for the 3 moles of tris (2-hydroxyalkyl) isocyanurate employed for reaction with the triphenyl phosphite or the like 3 moles of tris (2-hydroxyalkoxyalkyl) isocyanurate or 3 moles of tris (2-hydroxypolyalkoxyalkyl) isocyanurate. Examples of such starting materials include tris (2-hydroxyethoxyethyl) isocyanurate, tris (2-hydroxypropoxypropyl) isocyanurate, tris (2-hydroxybutoxybutyl) isocyanurate, tris (2-hydroxypolyethoxyethyl) isocyanurate where the polyethoxy group has a molecular weight of 2000, tris (2-hydroxydipropoxypropyl) isocyanurate, tris (2-hydroxypolypropoxypropyl) isocyanurate, where the polypropoxy group has a molecular weight of 3000, tris (2-hydroxypropoxypolyethoxypolypropoxypropyl) isocyanurate wherein the polyethoxy portion of the molecule has a molecular weight of 400 and the polypropoxy portion of the molecule has a molecular weight of 1900.

The tris (2-hydroxyalkoxyalkyl) isocyanurates and tris (2-hydroxypolyalkoxyalkyl) isocyanurates can be prepared in several ways. Thus, they are sometimes formed as impurities when reacting an alkylene oxide such as ethylene oxide or propylene oxide with cyanuric acid in the manner described in the Frazier et al. article. Alternatively, they can be prepared by reacting tris (2-hydroxyethyl) isocyanurate, or tris (2-hydroxypropyl) isocyanurate, or tris (2-hydroxybutyl) isocyanurate with the required amount of ethylene oxide, propylene oxide or 1,2-butylene oxide or mixtures thereof with an alkaline catalyst under conventional oxyalkylating conditions such as those set forth in De Groote Patent 2,499,365. Thus, to form tris (2-hydroxyethoxyethyl) isocyanurate there are reacted 3 moles of ethylene oxide with one mole of tris (2-hydroxyethyl) isocyanurate and to form tris (2-hydroxypropoxypropyl) isocyanurate there are reacted 3 moles of propylene oxide with one mole of tris (2-hydroxypropyl) isocyanurate.

Example 5

The procedure of Example 1 was repeated replacing the tris (2-hydroxyethyl) isocyanurate with 3 moles of tris (2-hydroxyethoxyethyl) isocyanurate to form tris [tris (2-hydroxyethoxyethyl) isocyanurate] phosphite as a viscous liquid residue after removal of the phenol by distillation. By the addition of 5 mole percent of n-butyl bromide to the product and heating to 120–130° C. for 5 hours there was formed the isomeric phosphonate.

Example 6

The procedure of Example 1 was repeated replacing the tris (2-hydroxyethyl) isocyanurate with 3 moles of tris (2-hydroxypropoxypropyl) isocyanurate to form tris [tris (2-hydroxypropoxypropyl) isocyanurate] phosphite as a viscous liquid residue after removal of the phenol. The product was converted to the isomeric phosphonate by heating for 7 hours with 4 mole percent of n-butyl bromide.

Example 7

The procedure of Example 1 was repeated replacing the tris (2-hydroxyethyl) isocyanurate with 3 moles of tris (2-hydroxypolyethoxyethyl) isocyanurate wherein the polyethoxy group has a molecular weight of 2000. The product was a viscous liquid. This was converted to the isomeric phosphonate by heating for 6 hours with 5 mol percent of n-butyl bromide.

I claim:

1. A member of the group consisting of

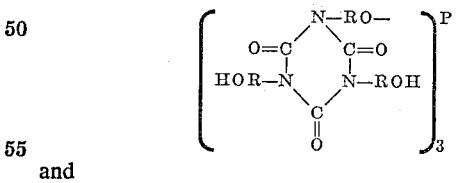

and

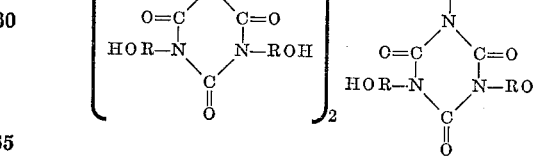

where R is a member of the group consisting of alkylene having 2 to 4 carbon atoms, alkylene oxyalkylene wherein both alkylene have 2 to 4 carbon atoms and an alkylene polyoxyalkylene wherein all alkylene have 2 to 4 carbon atoms.

2. Tris[tris(hydroxyalkyl)isocyanurate]phospite wherein there are 2 to 4 carbon atoms in the hydroxyalkyl group.

3. Tris[tris(2-hydroxyethyl)isocyanurate]phosphite.

4. Tris[tris(2-hydroxypropyl)isocyanurate]phosphite.

5. Bis[tris(hydroxyalkyl)isocyanurate] bis (2-hydroxyalkyl) alkylisocyanurate phosphonate wherein there are 2 to 4 carbon atoms in each hydroxyalkyl group and in the alkyl group, said compound having the formula:

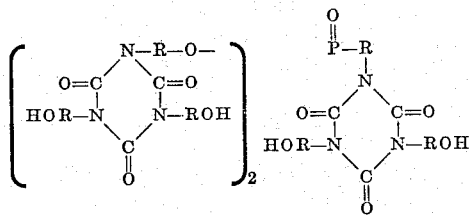

where R is alkylene having 2 to 4 carbon atoms.

6. Bis[tris(2-hydroxyethyl)isocyanurate]bis (2 - hydroxyethyl)ethylisocyanurate phosphonate, said compound having the formula:

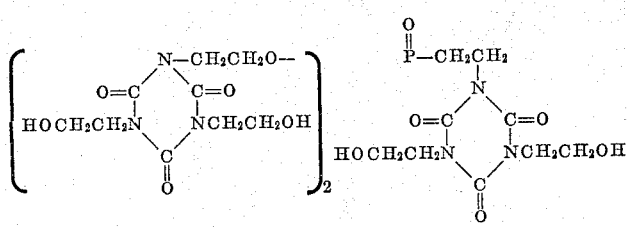

7. Bis[tris(2-hydroxypropyl)isocyanurate]bis (2 - hydroxypropyl) 2-methylethylisocyanurate phosphonate, said compound having the formula:

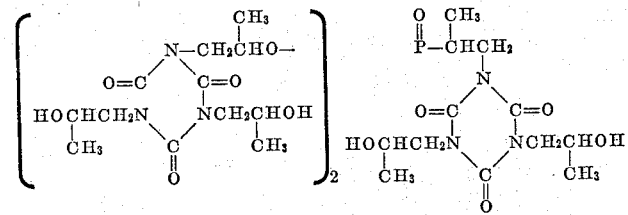

8. Tris[tris(hydroxyalkoxyalkyl)isocyanurate]phosphite wherein there are 2 to 4 carbon atoms in the alkyl group and in the alkoxy group.

9. Tris[tris(hydroxypolyalkoxyalkyl)isocyanurate]phosphite wherein there are 2 to 4 carbon atoms in each alkoxy group and in the alkyl group.

10. A phosphonate having the formula:

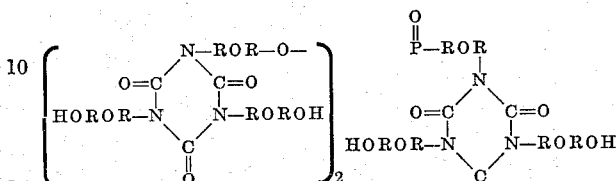

wherein each R is alkylene having 2 to 4 carbon atoms.

References Cited in the file of this patent

UNITED STATES PATENTS

| | | |
|---|---|---|
| 2,258,977 | Dickey et al. | Oct. 14, 1941 |
| 2,566,225 | Mackay et al. | Aug. 28, 1951 |
| 2,706,194 | Morris et al. | Apr. 12, 1955 |

OTHER REFERENCES

Frazier et al.: J. Org. Chem., vol. 25, pages 1944 to 1946 (1960).